United States Patent [19]

Stevens

[11] Patent Number: 4,719,719
[45] Date of Patent: Jan. 19, 1988

[54] APPLICATOR DISKS

[76] Inventor: Alec M. Stevens, Graham Road, Tolga, Australia, OSD 4882

[21] Appl. No.: 801,156

[22] PCT Filed: Mar. 5, 1985

[86] PCT No.: PCT/AU85/00039
  § 371 Date: Nov. 4, 1985
  § 102(e) Date: Nov. 4, 1985

[87] PCT Pub. No.: WO85/03845
  PCT Pub. Date: Sep. 12, 1985

[30] Foreign Application Priority Data

Mar. 5, 1984 [AU] Australia ................. PG3909

[51] Int. Cl.$^4$ ............................................ A01M 21/00
[52] U.S. Cl. ............................................ 47/1.5
[58] Field of Search .............. 47/1.5, 1.7; 239/145; D35/15; 15/49 R

[56] References Cited

U.S. PATENT DOCUMENTS

| 1,672,058 | 6/1928 | Cole | 47/1.5 |
| 3,198,396 | 8/1965 | Bailey | 47/1.5 |
| 3,212,216 | 10/1965 | Ludwig | 47/1.5 |
| 4,187,638 | 2/1980 | Hardy et al. | 47/1.5 |
| 4,199,896 | 4/1980 | Lehman | 47/1.7 |
| 4,464,862 | 8/1984 | Peterson et al. | 47/1.5 |

FOREIGN PATENT DOCUMENTS

| 56012 | 7/1982 | European Pat. Off. | 47/1.5 |
| 58612 | 8/1982 | European Pat. Off. | 47/1.5 |
| 2389420 | 12/1978 | France | 47/1.5 |
| 83/00601 | 3/1983 | PCT Int'l Appl. | 47/1.5 |

Primary Examiner—James R. Feyrer
Attorney, Agent, or Firm—Price, Gess & Ubell

[57] ABSTRACT

An applicator on a flexible support for herbicides and the like is formed with a rotating disk carrying a plurality of generally radially extending wicks. The wicks are fed by liquid from a central container and a rotatable cover is provided about the applicators.

12 Claims, 5 Drawing Figures

APPLICATOR DISKS

This invention relates to applicators and more particularly to wick style applicators to apply liquids such as weedicides to plant bodies.

Weeding is a process regularly undertaken in a variety of agricultural pursuits and most often is required to be done selectively in association with a cultivated crop which should not be affected by whatever chemical is employed against unwanted growth. A selective chemical effective against a broad range of weed growths whilst still safe to use in conjunction with the desired plant variety being cultivated, is a tall order making simple spraying of the weedicide material impossible and controlled applications are the usual mode of application. Various forms of controlled applicators are known. Reducing the amounts of materials to be deployed is possible where potent chemicals requiring only application in small quantities are used. Wipe on applicators active to wipe a smear of chemical over an unwanted plant are known. One form of this type of applicator simply involves a wick drawing liquid from a reservoir to be wetted thereby and apply liquid to anything it touches. In agricultural applications, banks of wicks are suspended off elongate booms to give effective ground coverage and the assembly is moved over a crop to be weeded on the back of a tractor or other motive vehicle.

A drawback of the present forms of wick applicators is that they are designed to wipe one way only over a plant and unless a multiple number of passes are made, application can be uneven and the effect of the applied chemical may not be effective in totally eradicating the weed.

It is an object of the present invention to provide an applicator capable of applying liquids with a better coverage than has hitherto been possible with liquid applicators. It is a further object of the present invention to provide an applicator which may be applied in orchards around the base of trees with no damage thereto. It is a still further object of the present invention to provide an applicator with an assisted flow characteristic to improve operation of the applicator. Other objects and advantages of the present invention will hereinafter become apparent.

According to the present invention there is provided an applicator for applying liquids selectively to plants growing about a cultivated crop comprising at least one applicator wick, a rotating support means being rotatable about an axis to support said wick in a manner providing a radially extending segment of said wick across a surface of said support, the inner end of said wick extending into a supply of the liquid to be applied.

In order that the invention may be more readily understood and put into practical effect, reference will now be made to the accompanying drawings which illustrate a preferred embodiment thereof and wherein.

Figure 1:
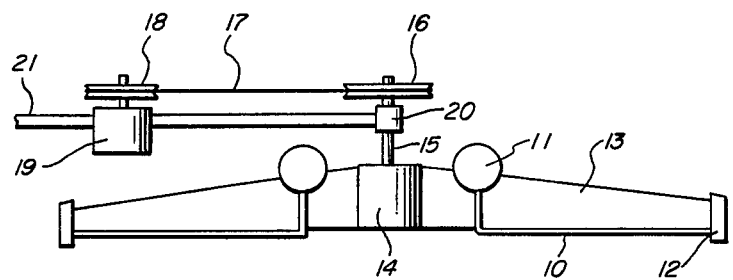
FIG. 1 is a side view of an applicator according to the present invention.

FIG. 1 shows an applicator provided with a number of wicks 10 disposed across the underneath surface of an applicator wheel comprised of a spoked structure run off a hub 14. Spokes 13 may support peripheral clamps 12 which serve to clamp the ends of wicks 10 which communicate fluids drawn from reservoir 11 along their length so as to wet whatever they touch. The applicator can be driven on a shaft 15 supported at a suitable rotary bearing means 20 by a motor 19 operating through suitable transmission means such as pulleys 18 and 16 and belt 17. Obviously sprockets and a chain may also be employed or a direct connection of a suitable motor and shaft 15 utilised.

In FIG. 1, with the reservoir 11 at a central location and the wicks oriented generally radially, the liquid flow is enhanced by the rotational speed of the applicator. The reservoir 11 might be constructed of common PVC pipe materials and the wheel structure can be spoked for light weight with the wicks supported thereunder for convenience. The wheel might simply be a complete disk cut from sheet material for simplicity with the wick material threaded therethrough so as to establish any number of wick patterns therebeneath.

In FIG. 1, the wicks may be supported at their ends by clamping within clamping means 12 which pinches the wick down onto the applicator rim to cut off the flow of liquid and support the end. Various means might be employed to support the length of the wick beneath the applicator disk and various wick patterns might be devised.

The applicator disk may be provided on movable support 21 in the manner described in greater detail below and mounted off a boom for tracking around the bases of trees in orchards.

Figure 2:
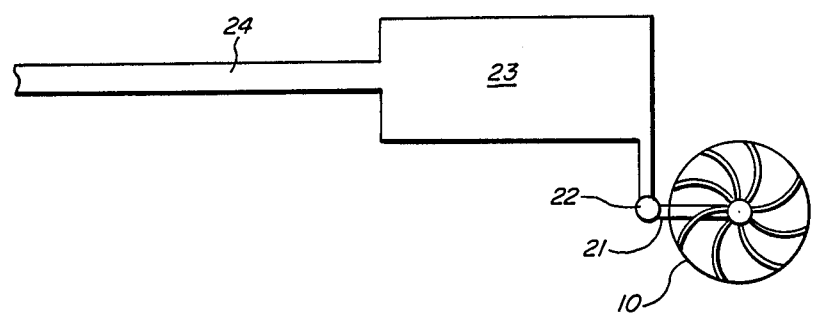
FIG. 2 is a plan view of an applicator according to the present invention.

FIG. 2 shows a schematic plan view of an applicator disk 10 on a support 21 pivotally mounted at 22 on a boom 24. The pivotal support enables the disk to move from a position outwardly of the end of the boom to a position beside it so that when being tracked past the base of trees in an orchard, the disk is able to track around the tree trunk without damage to either it or the tree. To do this the applicator disk is resiliently biassed to an outwardly disposed position.

In FIG. 2, boom 24 may carry a mower head 23 to be operated in conjunction with an applicator disk. Where the disk is provided with a mower head, the mower need not be taken as closely up to the tree and what it would normally miss can be poisoned by the applicator to give a more complete application than is normally possible.

Figure 3:
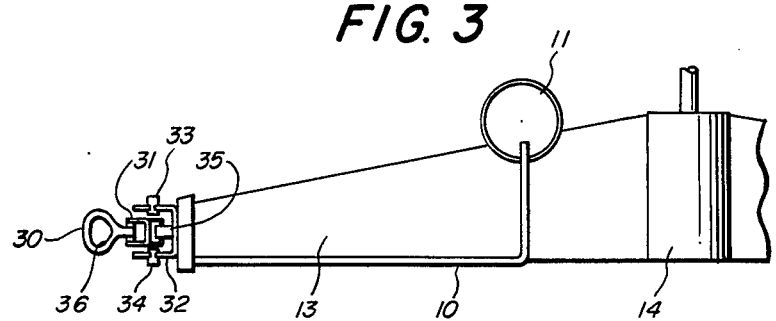
FIG. 3 is a detail of a rim structure which may be employed on an applicator in accordance with the present invention.

So that the applicator disk may pass around a tree trunk without scuffing the tree's bark as would normally occur because the disk is being rotated, the perimeter rim of FIG. 3 may be employed. In this embodiment the disk is merely provided with soft perimeter free to move around the disk so that when it makes contact with the tree to be held in frictional contact thereto, the disk may spin within the soft perimeter rim as it rides around the tree's trunk. To achieve this a bicycle type tire structure 30 may be provided on a wheel rim 31 movable within a perimeter channel 32 carried on the ends of spokes 13 of disk 10 rotating on driven hub 14. So that the wheel rim 31 may spin around the channel 32 bearing blocks such as 33 and 34 can be used to locate ghe wheel rim 31 vertically within the channel and bearing 35 locating it horizontally. A plurality of such bearing assemblies is provided as required about the disk rim. The tire 30 need not be elaborately structured and sufficient buffering for the rim is provided by a bicycle tire filled out with a length of garden type resilient hose to provide a soft perimeter bumper zone on the applicator disk.

The disposition of the wicks might be simply radial or they might be provided in more tangential arrangement to emerge from near the centre of the applicator and curve around outwardly to the perimeter. Where spoked arrangements are adhered to, the spokes might be provided with such a shape so that the wicks may simply be hung reliably thereunder without unsupported lengths that might otherwise become snagged and torn.

In order that the applicator may be withdrawn to its retracted position and no longer apply weedicide, a protective tray may be supported beneath the disk's retracted position to prevent its further operation. To ensure that effective wiping from all directions is achieved in one pass a plurality of contra-rotating disks might be provided to wipe over a weed from a number of sides as the assembly passes thereover.

Figure 4:
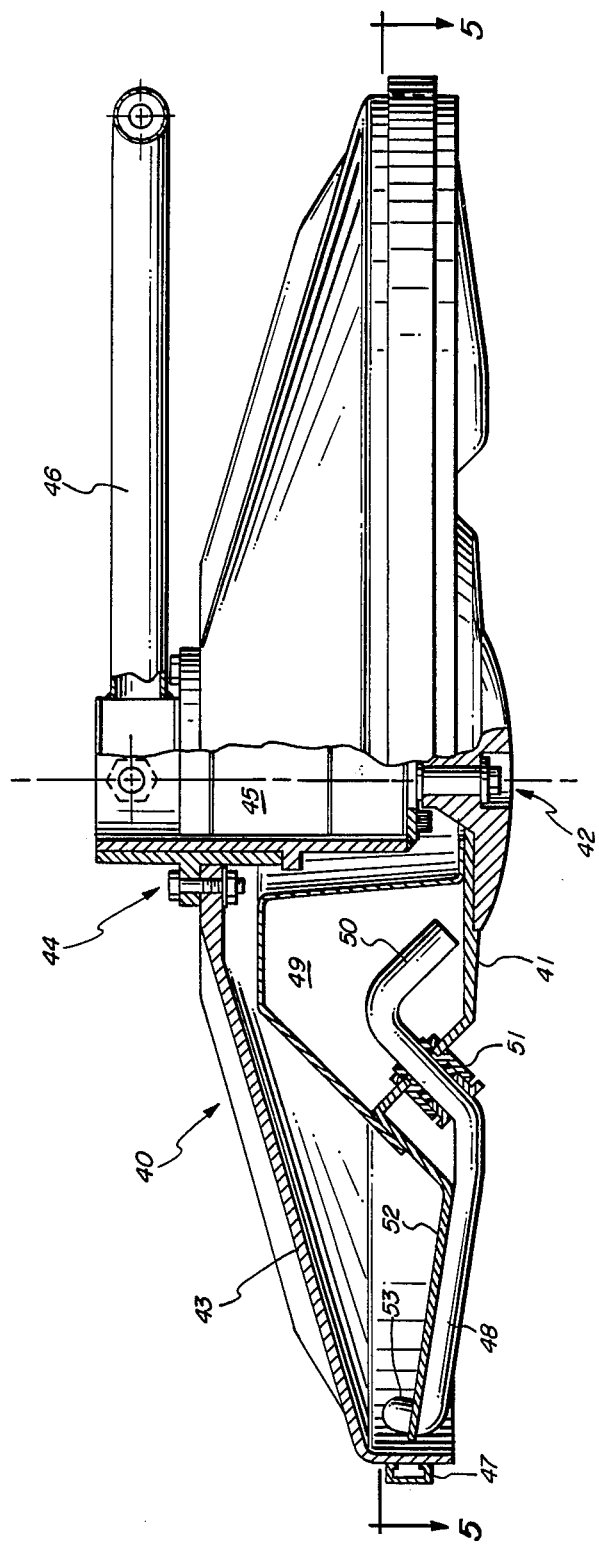
FIG. 4 is a vertical section through an applicator according to the present invention.

In FIG. 4 there is shown a particular embodiment of the invention wherein the applicator 40 is provided with a rotating disk-like support means 41 turning on motor shaft 42. The rotating disk 41 turns within a housing 43 with the lower surface of the disk exposed. The housing 43 can itself be free to rotate with suitable bearings provided at 44. The applicator disk-like support means 412 is turned by an hydraulic motor 45 with the disk-like support means bolted thereto at 42. The motor is supported in a housing on an arm 46 connected to the means of carrying the applicator in any suitable manner. The motor support housing may provide the bearing surfaces 44 for the housing 43 to turn on.

In order that the outer rim of housing 43 be prevented from damaging trunks of bushes and trees that the applicator might contact, the rim of housing 43 may be provided with a resilient strip 47 to act as a bumper means.

In FIG. 4, the disk-like support means carries a chamber 49 into which wick 48 is led with wick end 50 held by means 51. The other end of wick 48 is led up through an aperture over the disk's upper surface to be fed back to chamber 49 as is discussed below. Chamber 49 is filled with herbicides or other liquids, and wick segment 48 applies the liquid to plants as the applicator passes thereover.

Figure 5:
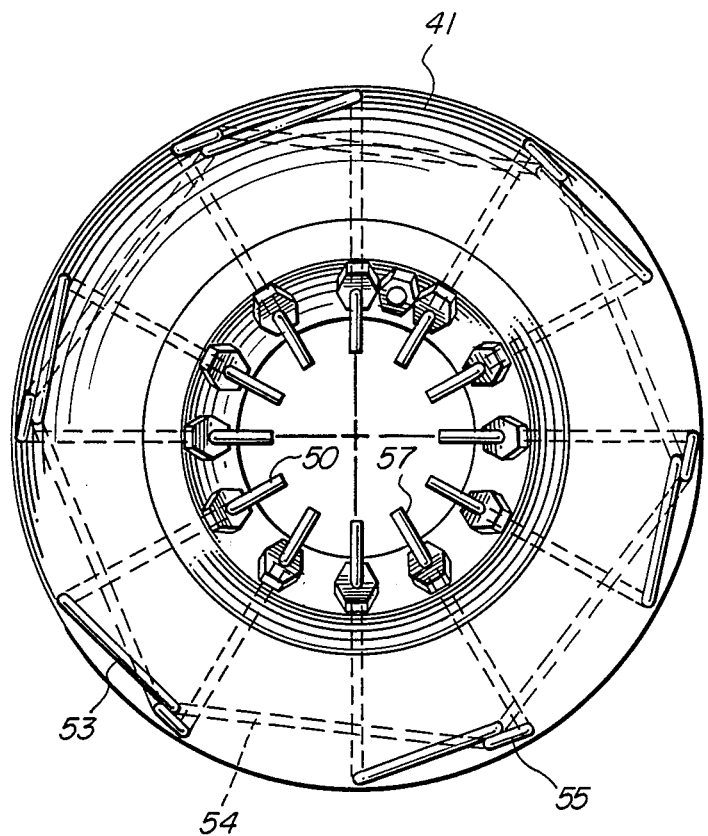
FIG. 5 is a sectional view through the applicator of FIG. 4 at a perpendicular to the axis of the applicator.

In FIG. 5 is seen a sectional view of FIG. 4 showing the disk-like support means from above. Wick end 50 leads out through seal and anchor means 51 to provide a radial segment 48. At the end of the disk, the wick is led to the upper surface through an aperture across the upper surface of 53 back down through an aperture and across the lower surface to provide a tangential segment. The wick is then led back over the top at 55 and under again to provide a radial segment 56 and back to the chamber at 57. Various patterns of wick can be developed by this method of threading through apertures in a disk.

While the above has been given by way of illustrative example, many modifications and variations as would be apparent to persons skilled in the art may be made thereto without departing from the broad scope and ambit of the invention as herein set forth and claimed in the following claims.

I claim:

1. An applicator for applying liquids selectively to plants growing about a cultivated crop comprising at least one applicator wick, said applicator including means holding a supply of liquid, a rotating support means being provided to support said wick, said wick having a radially extending segment and an inner end, said radially extending segment extending across a surface of said support means, the said inner end of said wick extending into said supply of liquid, said applicator further including a housing means, said rotating support means being housed in said housing means, said housing means shielding all but said surface which supports said at least one applicator wick.

2. An applicator for applying liquids as claimed in claim 1, wherein the housing means (43) is supported by a bearing means (44) upon which the housing means turns on an axis co-linear with the rotational axis of the rotating support means (41) said support means further including a motive means to rotate said support means.

3. An applicator for applying liquids as claimed in claim 1, wherein the housing means (43) is provided with a bumper (47) means thereabout to protect against damage inducing contacts.

4. An applicator for applying liquids as claimed in claim 3 wherein said support means (41) comprises an apertured disk (52), said at least one applicator wick being led generally radially outwardly across the lower surface of the disk to define said radially extending segment beneath the disk (48) and being threaded through a peripheral aperture and passing generally tangentially (53) across the upper surface of said disk to another peripheral aperture and being threaded therethrough and thereafter being led generally radially across the lower surface of said disk back to the center of said disk to define a second radially extending segment and a second inner end, said second inner end extending into said supply of liquid.

5. An applicator for applying liquids as claimed in claim 4, wherein the said inner ends of the said wick (50, 57) are anchored in said means holding a supply of liquid.

6. An applicator for applying liquids as claimed in claim 4, wherein the tangential extent of the applicator wick is over a part of its length fed back through apertures to the lower surface of said disk to provide a generally tangential segment of wick (54) in combination with the generally radial segments.

7. An arm supported, liquid chemical, applicator comprising in combination:
   a hub means;
   a rotatably driven shaft means supporting said hub means from said arm;
   a plurality of spoke means connected to and radiating outwardly from said hub means, each of said spoke means defining a flat bottom surface;
   a liquid chemical reservoir means supported by said spoke means adjacent said hub means, and clamp means located at the outermost extent of said spoke means;
   a wick means extending from within said liquid chemical reservoir means across a respective flat bottom surface into a respective clamp means; and
   a perimeter connecting means interconnecting said clamp means.

8. The applicator as claimed in claim 7, wherein said rotatably driven shaft means support arm includes flexible joint means, and motor, belt and pulley means, whereby power can be trained from said motor means to said rotatably driven shaft means in any position of said flexible joint means.

9. The applicator as claimed in claim 7, wherein said perimeter connecting means further includes a peripheral bumper means comprised of a resilient cushioning means, said cushioning means being held in a rim, said rim defining a channel and including a plurality of bearing surfaces.

10. An applicator for applying liquids to plants comprising at least one applicator wick, said applicator including means holding a supply of liquid and being characterized in that a rotating substantially disk shaped element is provided for supporting said wick, said disk shaped element having a top surface and a bottom surface and including a plurality of apertures, a container portion being formed in the central portion of said disk shaped element, said container portion defining said means holding a supply of liquid, said wick having inner and outer segments and a radially extending segment, said radially extending segment extending across the bottom surface of said disk shaped element, said inner segment passing through one of said apertures and extending into said container, said outer segment passing through another said aperture, said disk shaped element being fixed to a rotatable shaft, said shaft being connected to a motor, said motor being secured to a motor housing, for slidingly mounting a disk shaped element housing means and means for supporting said motor housing, an arm connected to said means for supporting said motor housing, and a disk shaped element housing means slidingly supported about said means for slidingly mounting the disk shaped element housing means.

11. An applicator for applying liquids selectively to plants growing about a cultivated crop, said applicator comprising at least one applicator wick (48), a rotating support means (41) having a surface and defining a liquid supply means to support said wick, said wick having a radially extending segment (48), said radially extending segment of said wick extending across said surface of said rotating support means (41), the inner end of said wick (50, 57) extending into said liquid supply means (11, 49), the rotating support means comprising a disk (52), said disk including a plurality of apertures therethrough, the applicator wick threaded through said apertures to form said radially extending segment (48), the liquid supply means being defined centrally on said disk, and formed by an integral inverted annular container, said annular container joined to the rotating support means (41), the annular container including at least one aperture the wick extending through said annular container aperture and having at least one end of the wick (50) within said annular container.

12. An applicator as claimed in claim 11, further including a plurality of wicks, each said wick being threaded in a loop through selected apertures in said disk, with both ends of each wick contained within the liquid container, with each loop extending over the disk surface and through the apertures in said disk with lengths above and below the disk so as to be held thereto.

* * * * *